April 5, 1927.

W. SWIATECKI 1,623,893

DEVICE FOR DROPPING BOMBS FROM AIRCRAFT

Filed Oct. 11, 1924　　2 Sheets-Sheet 1

INVENTOR
W. Swiatecki
BY
Langner, Parry, Card & Langner
ATTORNEY

April 5, 1927.　　　W. SWIATECKI　　　1,623,893
DEVICE FOR DROPPING BOMBS FROM AIRCRAFT
Filed Oct. 11, 1924　　　2 Sheets-Sheet 2
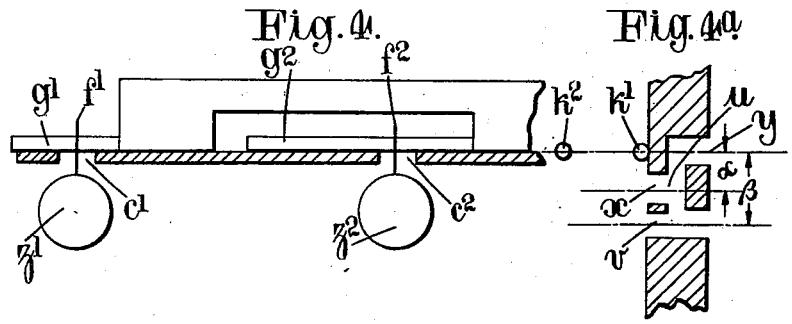
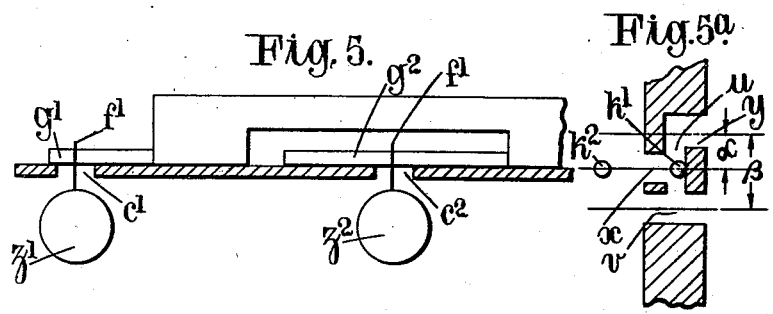
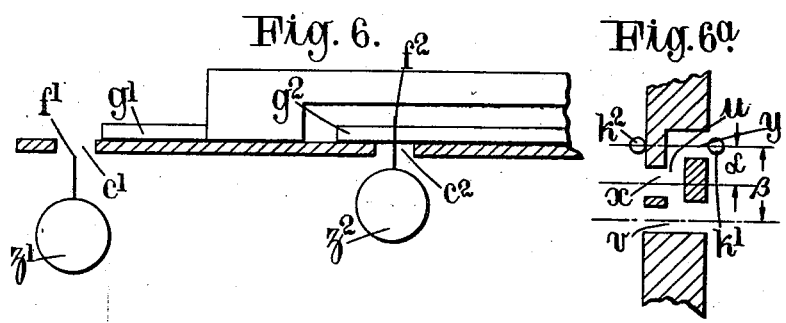
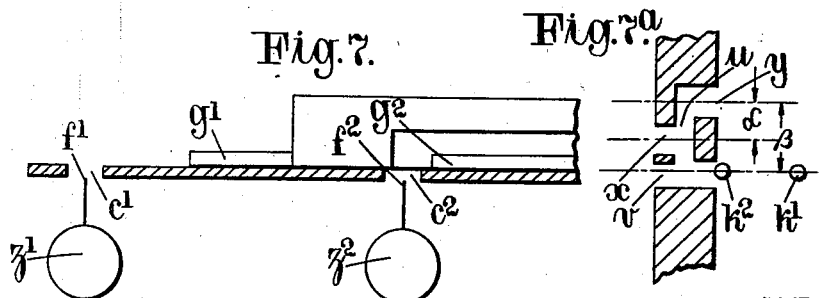
INVENTOR
W. Swiatecki
BY Langner, Parry, Card + Langner
ATTORNEYS.

Patented Apr. 5, 1927.

1,623,893

UNITED STATES PATENT OFFICE.

WLADYSLAW SWIATECKI, OF LUBLIN, POLAND.

DEVICE FOR DROPPING BOMBS FROM AIRCRAFT.

Application filed October 11, 1924, Serial No. 743,052, and in Great Britain July 15, 1924.

The invention is concerned with devices of the kind in which the bombs are released by one or more members adapted to be moved in horizontal planes and is more particularly concerned with devices of this nature provided with means for preventing accidental release of the bombs and adapted to release the bombs selectively either singly or in a series in quick succession.

In accordance with one feature of the present invention an improved and simple device of the kind referred to is provided comprising two-co-operating rods or tubes of suitable section adapted for relative horizontal movement one of these members having horizontal fingers of unequal length serving to support the bombs and to release them successively upon appropriate relative movement of the members.

Preferably these members are constituted by concentric tubes of which the outer one is formed with a number of holes corresponding with the number of bombs to be accommodated while the inner one is provided with a corresponding number of recesses and fingers for the support of the bombs.

The rods may be moved relatively to one another either by hand or mechanically. The moving force may be stored in a spring of which the action is retarded by a retaining lock, in which case the spring produces relative movement of the two rods when the lock is open. The number of bombs to fall may be made to depend on the amount of this movement.

Further features of the present invention will hereinafter appear and are pointed out in the appended claims.

The device is of such simple construction that it can be very conveniently applied to the aircraft; in aeroplanes, for example, the device may be arranged in the wings thereof so that it remains completely invisible and does not retard the flight.

In the accompanying drawings which illustrate one constructional embodiment of the invention applied to the wings of an aeroplane:—

Figs. 4, 4ª, 5, 5ª, 6, 6ª, 7, 7ª, are sections of the retaining lock in longitudinal section and cross section of the device for explaining the method of operation of the device.

Figure 1:
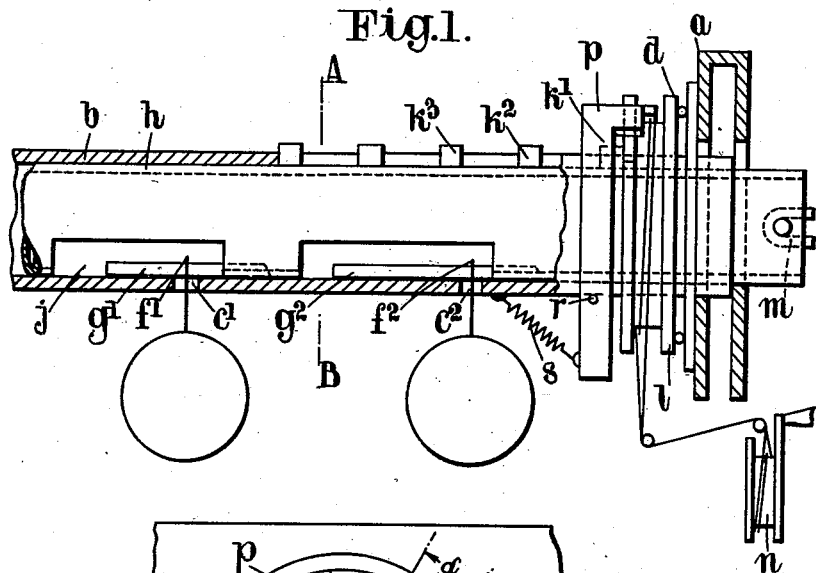
Figure 1 shows the device in side elevation partly in section.
Figure 2:
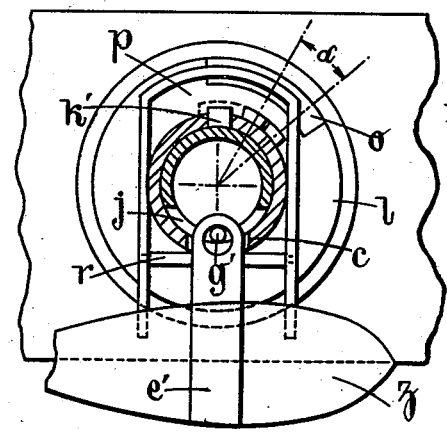
Figure 2 is a section on the line A—B of Figure 1.
Figure 3:
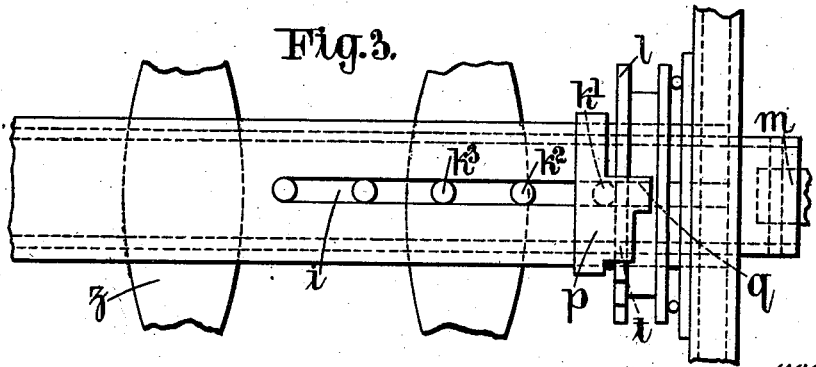
Figure 3 is a plan of the device.

In holes provided in the wings of the aeroplane is arranged an outer tube $b$ which on its underside has a number of holes $c'$, $c^2$ . . . corresponding with the number of bombs to be dropped. On the upper side of the tube $b$ is a longitudinal slot $i$ with which engage pins $k'$ $k^2$, $k^3$ . . . secured to an inner tube $h$. This inner tube $h$ is provided with a suitable number of recesses $j$ in which are arranged fingers $g'$, $g^2$ . . . for engagement with eyes in bands embracing the bombs to be dropped. A double flanged disc $l$ mounted adjacent the end of the tube $h$ bears, by means of ball bearings $d$, against a yoke $a$ and by means of a pin $k'$, bearing thereon, it retards the action of a spring $m$ having its inner end secured to the inner tube $h$ and its other end secured to any suitable fixed part. The axially immovable disc $l$ is rotated by means of belt or rope transmission from a crank wheel $n$ located in the cabin of the aircraft. The rotary movements of the disc are limited by a safety device. For this purpose the disc is provided on one of its edges or flanges with a recess $o$ (Fig. 2) with which engages the tooth $t$ (Fig. 3) of a locking member $p$ rockably mounted on a hinge $r$ and constantly pulled by a spring $s$ in such a manner that the tooth $t$ engages with the recess $o$.

The locking member $p$ has two teeth $t$, and $q$. So long as the tooth $t$ remains in the recess $o$ the ends of the latter by engagement with the tooth $t$ limit the rotation of the disc $l$ in both directions to the angle $\alpha$. If however, the locking member $p$ is moved about its hinge $r$ so that the tooth $t$ leaves the recess $o$, the disc can move further in one direction so that the total angular movement is represented by the angle $\beta$ until the edge of the recess reaches the ratchet tooth $q$ which, even during the largest possible movement of the locking member, remains in the recess $o$.

The disc $l$ is provided with an opening $v$ (Figs. 4–7) extending transversely therethrough. In addition to this opening it is provided on one of its surfaces with a recess $x$ and on the opposite surface with a recess $y$. These recesses are not directly opposite but are connected together by an internal passage $u$ which also leads to the opening $v$. The openings $x$, $y$, $u$, $v$ are of such section that the pins $k'$ and $k^2$ can pass therethrough.

When the inner tube $h$ has been pushed completely into the outer tube $b$, the fingers $g'$ $g^2$ ... engage with the eyes $f'$ $f^2$ ... of the bands $e'$, $e^2$ ... and the nearest pin $k'$ bears against the disc $l$ (Figs. 4, 4a). All the bombs $z'$, $z^2$ ... are thus suspended. If the crank $n$ in the cabin is rotated the disc $l$ is turned through the angle $\alpha$ whereby the opening $x$ is brought opposite the first pin $k'$ whereupon the spring $m$ draws the tube $h$ out of the tube $b$ a distance equal to the depth of the recess $x$. The pin $k'$ now strikes against the wall of the passage $u$ (Figs. 5, 5a) and at the same time the finger $g'$ has been moved somewhat out the eye $f'$ of the band $e'$. The remaining fingers $g^2$ ... which are longer than the finger $g'$, still serve as supports for the eyes of the remaining bands. If by turning back the crank $n$ in the cabin the disc $l$ is caused to turn backwards through the angle $\alpha$ and is returned to its original position, the pin $k'$ moves along the wall of the passage $u$ and passes out of the disc so that the tube $h$ is pulled out of the tube $b$ until the pin $k^2$ strikes against the disc $l$ (Figs. 6, 6a). In this position the finger $g'$ entirely leaves the eye $f'$ of the band $e'$ and the bomb $z'$ falls. The remaining fingers $g^2$ ... which are longer than $g'$ continue to serve as supports for the eyes of the bands $e^2$ ... By oscillating the disc $l$ through the angle $\alpha$ in one direction or the other the pins $k^2$ $k^3$ ... successively take up positions previously taken up by the pin $k'$ whereby the tube $h$ is drawn more and more out of the pipe $b$ and the fingers $g^2$ $g^3$ ... are successively withdrawn from the eyes so that the bombs $z^2$ ... fall successively. If the safety device is moved and the disc $l$ is swung from its original position through the angle $\beta$ so that the opening $v$ comes opposite the row of pins $k'$ $k^2$ ... (Figs. 7, 7a) then the action of the spring $m$ causes all the pins $k'$ $k^2$ ... to pass through this opening, the tube $h$ being drawn as far as possible out of the tube $b$, all the fingers $g'$, $g^2$ ... being withdrawn successively from the eyes $f'$ $f^2$ and all the bombs falling successively by a single movement of the disc $l$.

In the form of construction illustrated the members $b$ and $h$ are in the form of tubes. They may however have a different cross section and may for example be U-shaped. The arrangement may also be such that when releasing the bombs the inner tube passes into the outer one. A number of such devices may be provided on the same wing and in this manner the efficiency of the aircraft may be increased considerably.

It is to be understood that the term "bomb" used throughout the foregoing description is to be construed as including any other article as for example a mail bag.

What I claim is:—

1. A bomb dropping device comprising two relatively reciprocally movable rods, a number of fingers in a row on one of said rods for supporting bomb carrying eyes, the other of said rods being formed with a corresponding number of openings in a row through which said bomb carrying eyes can pass for engagement with said fingers the latter being withdrawable from said eyes to release the bombs by relative reciprocal movement between said rods, the said rods being tubular and the rod with the fingers being disposed within the other of said rods.

2. A bomb dropping device comprising two relatively movable rods engaging bomb supporting means, a spring for causing the relative movement between said rods, a plurality of pins on one of said rods and means co-operating with said pins to arrest the movement of the spring actuated rod and permit its advance in stages, whereby a plurality of bombs is released successively.

3. A bomb dropping device as claimed in claim 2 wherein the means for co-operating with the pins on one of the two relatively movable rods comprises a lock having three openings corresponding in shape with the shape of the pins, one of said openings passing right through the lock whilst the other two openings which are not in alignment communicate with opposite ends of a passage connecting all three openings together and extending at right angles to the direction of relative movement of the rods.

4. A bomb dropping device comprising two relatively movable rods engaging bomb supporting means, means for applying a force to cause such relative movement between the rods, a plurality of pins of one of the rods, a lock for co-operating with said pins to determine relative movement between said rods said lock having three openings permitting the pins to pass, one of said openings passing right through the lock whilst the other two openings which are not in alignment communicate with opposite ends of a passage connecting all three openings together and extending at right angles to the direction of the relative movement of the rods, and a safety device operating to limit the movement of the lock so that the latter can be set in one or other of two end positions wherein one or other of two of the openings in the lock can lie in a straight line with the pins in a row on one of said rods, whilst when the safety device is released the lock may assume a third position in which another opening extending straight through the lock comes opposite the row of pins.

5. A bomb dropping device as claimed in claim 2 wherein the means co-operating with the pins to arrest the movement of the spring actuated rod comprises a lock with an opening on each side thereof to permit passage of the pins through said lock, said openings being out of alignment but communicating with a passage which connects said openings and extends at right angles to the direction of relative movement of the rods, and a safety device permitting the said lock to be set in such a position that one of the pins can pass through the first of said openings whereupon on moving the lock to the other limit of the movement permitted by said safety device said pin passes along said communicating passage and can then pass right through the lock by way of said other opening thus releasing one bomb whereupon the next pin abuts against the lock.

6. A bomb dropping device comprising horizontal relatively slidable rods a series of bomb supporting fingers of different lengths upon one of said rods, the other rod being so formed that relative sliding movement of the rods will release the bombs, means applying a force to cause said relative movement, and a lock for normally restraining said movement a series of abutments on one of said rods co-operating with said lock so that when the lock is in to one position relative movement of the rods causes the bomb supporting fingers to be partly withdrawn, without permitting any bomb to fall, and that when the lock is moved to another position one of said fingers is wholly withdrawn permitting a single bomb to fall.

7. A bomb dropping device comprising two relatively horizontally movable co-operating rods a plurality of horizontal fingers of unequal length on one of said rods serving to support the bombs and to release them successively upon appropriate relative movement of said rods, means exerting a force to cause such relative movement, and means for restraining such movement or to permit it at will.

8. A bomb dropping device as claimed in claim 7 wherein the means for restraining or permitting relative movement of said rods comprise a plurality of pins on one of said rods and a lock formed with such passages that by operation of said lock the bombs can be dropped either singly at chosen moments or in a series in quick succession.

9. A bomb dropping device comprising two relatively horizontally movable rods a plurality of horizontal fingers on one of said rods a corresponding number of openings in the other of said rods permitting the bombs to be attached to said fingers, a spring to cause relative movement of said rods, a plurality of pins on one of said rods, a lock fixed against horizontal movement relative to the other of said rods co-operating with said pins to control relative movement of said rods, said lock being movable angularly to bring openings therein in line with said pins, and means for limiting the angular movement of said lock.

10. A bomb dropping device as claimed in claim 9 wherein the means for limiting the angular movement of the lock can be set in two different conditions one of which permits greater angular movement of the lock than the other.

In testimony whereof I have signed my name to this specification.

WLADYSLAW SWIATECKI.